(12) United States Patent
Li

(10) Patent No.: US 7,719,829 B2
(45) Date of Patent: May 18, 2010

(54) ANTI-VIBRATION CAGE FOR DATA STORAGE DEVICE

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 434 days.

(21) Appl. No.: 11/849,309

(22) Filed: Sep. 3, 2007

(65) Prior Publication Data

US 2009/0040709 A1 Feb. 12, 2009

(30) Foreign Application Priority Data

Aug. 10, 2007 (CN) .................... 2007 2 0200807 U

(51) Int. Cl.
*G06F 1/16* (2006.01)
(52) U.S. Cl. ............................. 361/679.34; 361/679.33; 361/724; 361/727; 312/223.2; 248/638
(58) Field of Classification Search ............ 361/679.33, 361/679.34
See application file for complete search history.

(56) References Cited

U.S. PATENT DOCUMENTS

| | | | | |
|---|---|---|---|---|
| 4,705,257 A | * | 11/1987 | Leo et al. .................... | 248/611 |
| 4,937,806 A | * | 6/1990 | Babson et al. ............... | 720/651 |
| 5,627,727 A | * | 5/1997 | Aguilera et al. ........ | 361/679.43 |
| 6,008,984 A | * | 12/1999 | Cunningham et al. .. | 361/679.31 |
| 6,138,980 A | * | 10/2000 | Farbotnik .................... | 248/638 |
| 6,333,848 B1 | * | 12/2001 | Aida et al. .............. | 361/679.34 |
| 6,473,299 B1 | | 10/2002 | Worden et al. | |
| 6,505,806 B1 | * | 1/2003 | Glaesener .................... | 248/638 |
| 7,137,767 B2 | * | 11/2006 | Franke et al. ............... | 411/401 |
| 7,196,902 B2 | * | 3/2007 | Albrecht et al. ........ | 361/679.33 |
| 7,307,835 B1 | * | 12/2007 | Barina et al. ........... | 361/679.31 |
| 7,312,999 B1 | * | 12/2007 | Miyamura et al. .......... | 361/724 |
| 7,463,483 B1 | * | 12/2008 | Chen ...................... | 361/679.33 |
| 2003/0169565 A1 | * | 9/2003 | Wang .......................... | 361/685 |
| 2008/0019091 A1 | * | 1/2008 | Fan et al. ..................... | 361/685 |

* cited by examiner

*Primary Examiner*—Jayprakash N Gandhi
*Assistant Examiner*—Anthony Q Edwards
(74) *Attorney, Agent, or Firm*—Frank R. Niranjan

(57) ABSTRACT

An anti-vibration cage (10) for data storage device, includes at least a first securing piece (161) with a first pivot hole (1611) defined therein; at least a second securing piece (163) with a second pivot hole (1631) defined therein, and at least a rotatable damping member (20). A gap (1633) is formed in the second securing piece and communicated with the second pivot hole. The damping member includes a damping portion (25) configured to dampen vibration for the data storage device and a shaft (22) inserted through the damping portion. The shaft has a first end (21) and a second end (23) protruding out from the damping portion respectively. The first end of the shaft is rotatably engaged in the first pivot hole. The second end of the shaft is rotatably engaged in the second pivot hole and releasable from the gap.

20 Claims, 3 Drawing Sheets

ANTI-VIBRATION CAGE FOR DATA STORAGE DEVICE

CROSS-REFERENCE TO RELATED APPLICATION

This application is cross-referenced to a pending U.S. patent application Ser. No. 11/309,240, filed on 2006, Jul. 18, and assigned to the same assignee. The above-identified application is incorporated herein by reference.

BACKGROUND

1. Technical Field

The present invention relates to anti-vibration cages for data storage devices, and more particularly to an anti-vibration cage with detachable damping members.

2. General Background

In a conventional server or computer system, a plurality of data storage devices is usually provided. When the data storage devices are at work, vibration is generated and may damage the data storage devices. In order to reduce the damage to the data storage devices, damping members are often provided.

For example, a mounting apparatus for data storage devices includes an exterior cage and an interior case for receiving data storage devices therein. The exterior cage includes several damping members rotatably attached to sidewalls thereof. Each of the damping members includes a damping portion made of vibration absorbing material, and a shaft inserted through the damping portion along a radial direction. When the interior cage, together with data storage devices, is pushed into the exterior cage, sidewalls of the interior cage touch the damping portions of the damping members, and drive the damping portions to rotate about the shafts to minimize friction between the damping portions and the interior cage and allow convenient installation of the interior cage. However, once the shafts of the damping members are attached to the exterior cage, they are difficult to remove.

What is needed, therefore, is an anti-vibration cage with conveniently detachable damping members for dampening vibration of data storage devices.

SUMMARY

An anti-vibration cage for a data storage device, includes at least a first securing piece with a first pivot hole defined therein; at least a second securing piece with a second pivot hole defined therein, and at least a rotatable damping member. A gap is formed in the second securing piece communicating with the second pivot hole. The damping member includes a damping portion configured to dampen vibration for the data storage device and a shaft inserted through the damping portion. Ends of the shaft protrude from ends of the damping portion respectively, to rotatably engage in the first and second pivot holes and are passable through the gap so as to facilitate assembly or disassembly of the dampening member to or from the anti-vibration cage.

Other advantages and novel features will be drawn from the following detailed description of preferred embodiments with attached drawings, in which:

DETAILED DESCRIPTION OF PREFERRED EMBODIMENTS

Figure 1:
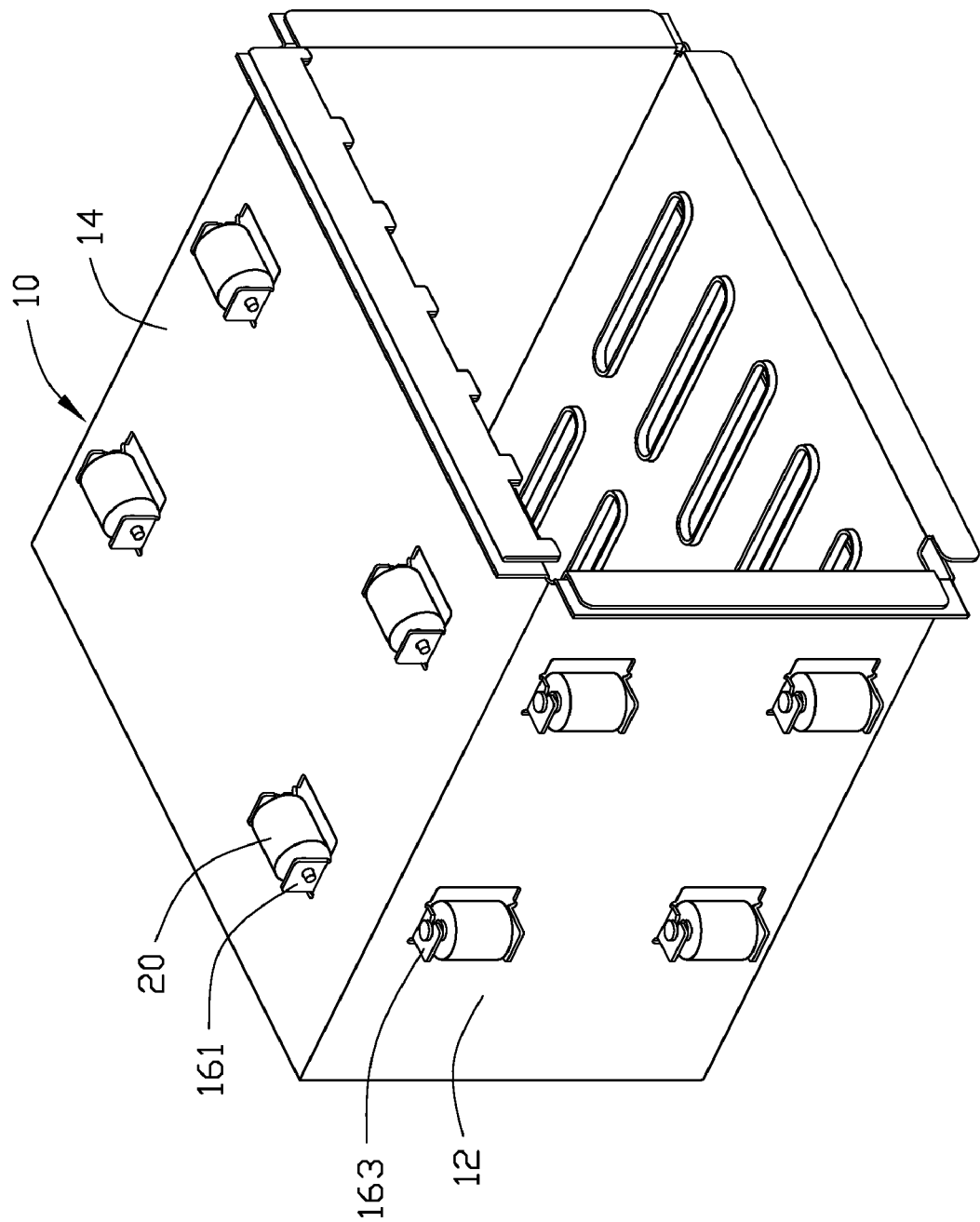
FIG. 1 is an isometric view of an anti-vibration cage with detachable damping members for data storage devices in accordance with a preferred embodiment of the present invention.

Referring to FIG. 1, an anti-vibration cage 10 for data storage devices, includes a plurality of damping members 20 rotatably attached to enclosure panels thereof. Only the damping members 20 attached to adjacent enclosure panels 12, 14 of the anti-vibration cage 10 are shown in FIG. 1.

Figure 2:
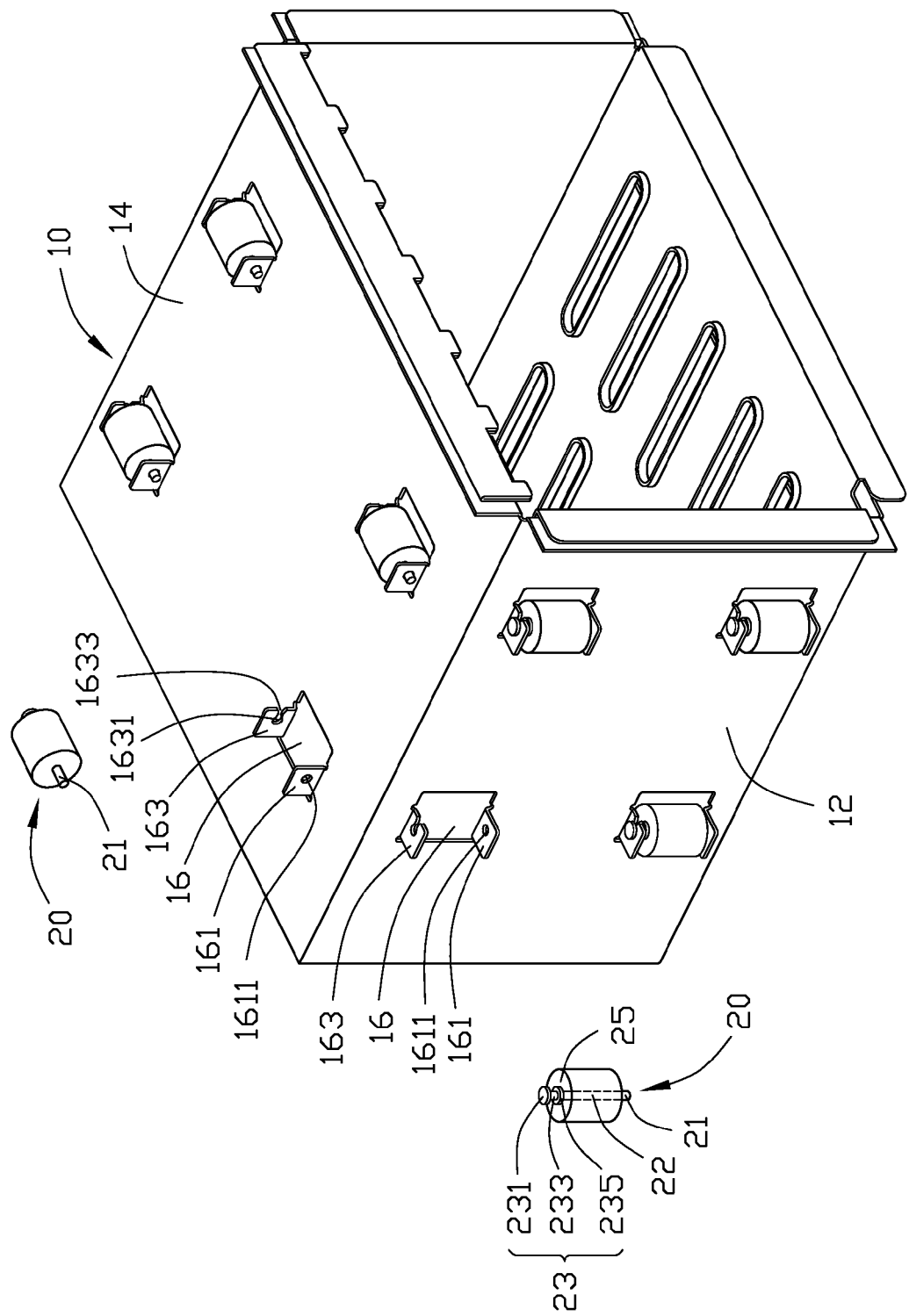
FIG. 2 is a semi-exploded view of FIG. 1, with two of the damping members detached from the anti-vibration cage.

Referring to FIG. 2, a plurality of rectangular openings 16 are respectively defined in the panels 12, 14. A pair of securing pieces 161, 163 extends perpendicularly outward from each of the panels 12, 14 from opposite sides of each rectangular opening 16 respectively. A width of each of the securing pieces 161, 163 is less than that of the rectangular opening 16. A first pivot hole 1611 is defined in the securing piece 161, and a second pivot hole 1631 is defined in the securing piece 163. The securing piece 163 defines a gap 1633 communicating with the second pivot hole 1631 therein at a side edge thereof.

Each damping member 20 includes a cylindrical damping portion 25, and a shaft 22 inserted through an axial through hole (not shown) of the damping portion 25. The damping portion 25 of the damping member 20 is made from resilient material, which is capable of dampening vibration, such as rubber. The shaft 22 is made from rigid material, such as steel. A first end 21 and a second end 23 of the shaft 22 protrude out from opposite ends of the damping portion 25 respectively. The second end 23 of the shaft 22 includes a first cap 231, a neck 233, and a second cap 235. The neck 233 is connected between the first cap 231 and the second cap 235. The diameter of the first or second cap 231, 235 is greater than the diameter of the second pivot hole 1631 of the securing piece 163 of the anti-vibration cage 10. The diameter of the neck 233 is less than that of the second pivot hole 1631 and a little greater than a natural width of the gap 1633 of the securing piece 163. The diameter of the first end 21 of the shaft 22 is less than that of the first pivot hole 1611.

Figure 3:
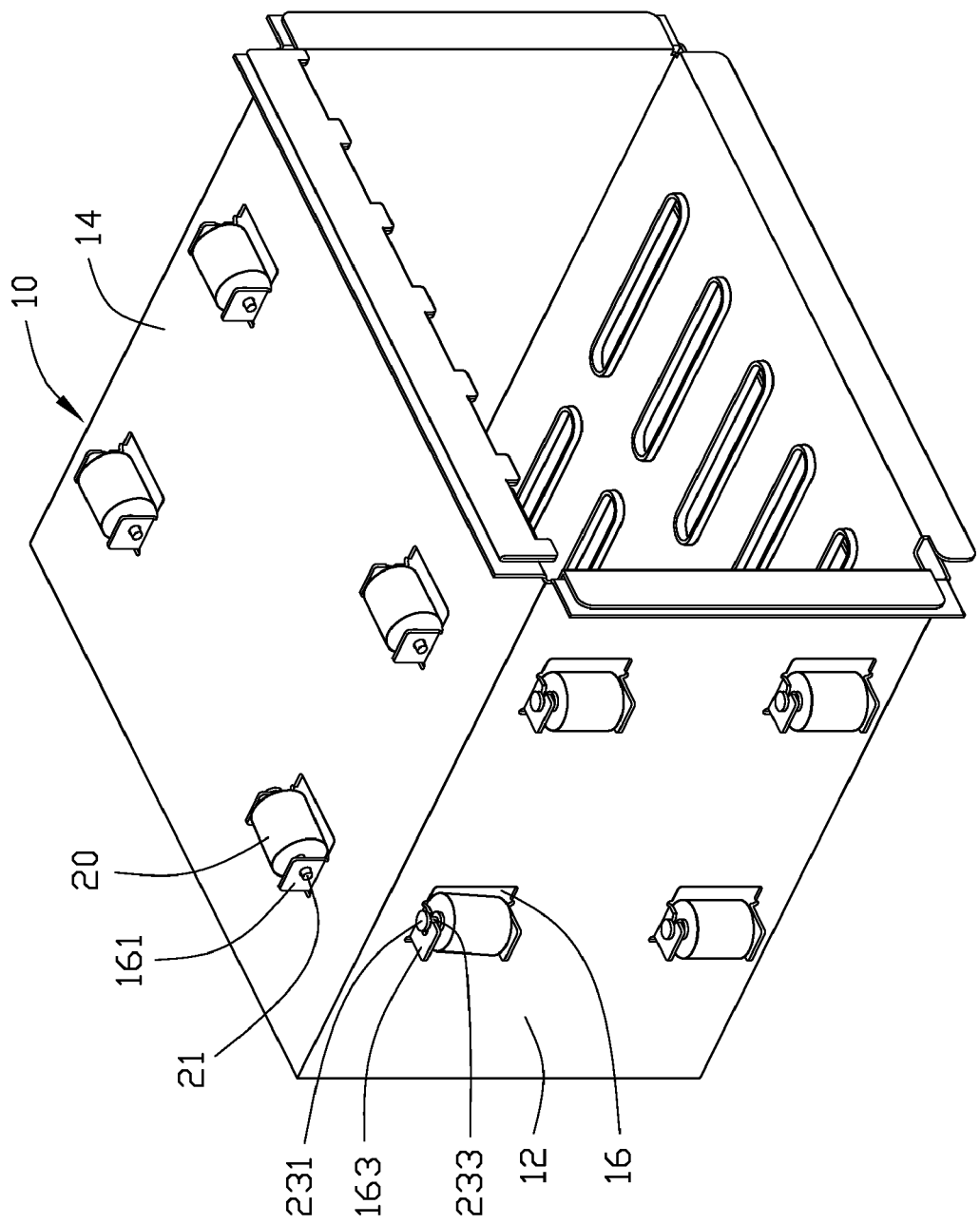
FIG. 3 is similar to FIG. 2, showing the two detached damping members being engaged with the disk drive cage.

Referring also to FIG. 3, in assembling each of the damping members 20, the first end 21 of the shaft 22 of the damping member 20 is inserted into the first pivot hole 1611 of the securing piece 161. Then the shaft 22 is moved to a perpendicular position with respect to the securing pieces 161, 163 where the neck 233 of the second end 23 is engaged in the second pivot hole 1631, from a slanted position with respect to securing pieces 161, 163 where the neck 233 is engaged to the gap 1633 and resiliently expands the gap 1633 (See FIG. 3). The gap 1633 of the securing piece 163 returns to its natural width after the neck 233 is fully engaged into the second pivot hole 1631 so that the neck 233 is prevented from accidentally escaping from the second pivot hole 1631 via the gap 1633. Since the first and second caps 231, 235 are larger than the second pivot hole 163, the damping member 20 is reliably and rotatably attached to the securing pieces 161, 163.

In disassembling each of the damping members 20, the second end 23 of the shaft 22 is moved to expand the gap 1633 so that the neck 233 of the second end 23 of the shaft 22 of the damping member 20 is enabled to disengage from the second pivot hole 163 via the gap 1633. Then the first end 21 of the shaft 22 is taken out from the first pivot hole 1611 of the securing piece 161. Thus, the damping member 20 is disassembled from the disk drive bracket 10.

When an interior disk drive cage (not labeled) receiving data storage devices therein is slid into or out from the anti-vibration cage 10, the damping members 20 rotating about the shafts 22 thereof to decrease friction between the interior disk drive cage and the anti-vibration cage 10 and facilitate the interior disk drive cage sliding along the anti-vibration cage 10.

In use, when the interior disk drive cage collides with the anti-vibration cage 10 due to vibration of data storage devices, the damping portions 25 of the damping members 20 touch the interior disk drive cage and dampen the vibration. Thus, data storage devices in the anti-vibration cage 10 are protected from vibration.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An anti-vibration cage for a data storage device, comprising:
    at least a first securing piece with a first pivot hole defined therein;
    at least a second securing piece with a second pivot hole defined therein opposite and parallel to the first securing piece, an expandable gap being formed in the second securing piece and communicating with the second pivot hole; and
    at least a damping member comprising a damping portion for dampening vibration generated from the data storage device, and a shaft inserted through the damping portion, the shaft having a first end and a second end protruding out from opposite ends of the damping portion respectively, the first end of the shaft rotatably engaged in the first pivot hole of the first securing piece, the second end of the shaft rotatably engaged in the second pivot hole of the second securing piece and being passable from the expandable gap.

2. The anti-vibration cage as described in claim 1, wherein the second end of the shaft comprises a neck rotatably engaged in the second pivot hole of the second securing piece, and a first cap and a second cap sandwiching the second securing piece therebetween for preventing the shaft pulling out from the second securing hole along a direction perpendicular to the second securing piece.

3. The anti-vibration cage as described in claim 2, wherein a diameter of the neck of the second end of the shaft is less than that of the second pivot hole, a diameter of the first and second caps is greater than that of the second pivot hole, and a diameter of the first end of the shaft is less than that of the first pivot hole.

4. The anti-vibration cage as described in claim 3, wherein the neck engaged in the second pivot hole is prevented from accidentally disengaging from the second pivot hole via the gap.

5. The anti-vibration cage as described in claim 4, wherein the gap has a natural width less than the diameter of the neck of the second end of the shaft, and an expanded width equal to the diameter of the neck of the second end of the shaft when the gap is expanded by the neck being forcibly passed through the gap.

6. The anti-vibration cage as described in claim 1, further comprising at least a panel with at least an opening defined therein for accommodating the damping member, wherein the first and second securing pieces are extended perpendicularly outward from the panel at opposite sides of the opening respectively, and the second end of the shaft is releasable from the gap along a direction parallel to the panel.

7. The anti-vibration cage as described in claim 6, wherein the opening is rectangular, and a width of the opening is greater than that of the securing pieces, a length of the opening is not less than that of the damping portion of the damping member.

8. The anti-vibration cage as described in claim 1, wherein the damping member is generally cylindrical.

9. A anti-vibration cage for data storage devices received therein, comprising:
    a first panel and a second panel perpendicularly connecting with each other, each panel comprising at least one pair of parallel securing pieces extending perpendicularly outward therefrom, a first pivot hole being defined in one of the securing pieces, a second pivot hole and a gap communicating with the second pivot hole being defined in another one of the securing pieces, the gap being formed at a side edge of said another one of the securing pieces, said side edge perpendicular to a conjunct edge of the first and second panels; and
    at least a rotatable damping member comprising a damping portion for dampening vibration generated from the data storage devices, and a shaft inserted through the damping portion, the shaft having a first end, and a second end protruding out from the damping portion respectively, the first end of the shaft rotatably engaged in the first pivot hole, the second end of the shaft rotatably engaged in the second pivot hole via the gap.

10. The anti-vibration cage as described in claim 9, wherein the second end of the shaft comprises a neck rotatably engaged in the second pivot hole of said another one of the securing pieces, and a first cap and a second cap sandwiching said another one of the securing pieces therebetween for preventing the shaft moving out from the second securing hole along a direction perpendicular to the securing pieces.

11. The anti-vibration cage as described in claim 10, wherein a diameter of the neck of the second end of the shaft is less than that of the second pivot hole, a diameter of the first and second caps is greater than that of the second pivot hole, and a diameter of the first end of the shaft is less than that of the first pivot hole.

12. The anti-vibration cage as described in claim 10, wherein a diameter of the neck of the second end of the shaft is greater than a natural width of the gap, and the neck is blocked by the gap when rotatably engaging in the second pivot hole.

13. The anti-vibration cage as described in claim 10, wherein the gap is widened when the neck of the second end of the shaft is passing through the gap.

14. The anti-vibration cage as described in claim 9, wherein the damping member is rotatable about an axis perpendicular to the conjunct edge of the first and second panel.

15. The anti-vibration cage as described in claim 9, wherein the damping member is generally cylindrical.

16. The anti-vibration cage as described in claim 9, wherein each panel defines at least a rectangular opening therein for accommodating the damping member, the securing pieces locate at two sides of the opening, and the width of the opening is greater than that of the securing pieces, a length of the opening is not less than that of the damping portion of the damping member.

17. A anti-vibration cage for data storage devices received therein, comprising:

a first panel;

a second panel adjoining the first panel;

a plurality of first and second securing pieces extending from at least one of the first and second panels, each of the first securing pieces having a first pivot hole, each of the second securing pieces having a second pivot hole and a gap communicating with the second pivot hole, the gap being formed at a side edge of the second securing pieces, said side edge perpendicular to a conjunct edge of the first and second panels; and a plurality of rotatable damping member each comprising a damping portion for dampening vibration generated from the data storage devices, and a shaft extending through the damping portion, the shaft having a first end, and a second end protruding out from opposite ends of the damping portion respectively, the first end of the shaft rotatably engaged in the first pivot hole, the second end of the shaft rotatably engaged in the second pivot hole and passable from the gap.

18. The anti-vibration cage as described in claim 17, wherein the second end of the shaft comprises a neck rotatably engaged in the second pivot hole of the second securing piece, a first cap, and a second cap sandwiching the second securing piece therebetween for preventing the shaft moving out from the second securing hole along a direction perpendicular to the securing pieces.

19. The anti-vibration cage as described in claim 18, wherein a diameter of the neck of the second end of the shaft is less than that of the second pivot hole, a diameter of the first and second caps is greater than that of the second pivot hole, and a diameter of the first end of the shaft is less than that of the first pivot hole.

20. The anti-vibration cage as described in claim 19, wherein a diameter of the neck of the second end of the shaft is greater than a natural width of the gap.

* * * * *